(12) United States Patent
Redmann

(10) Patent No.: US 10,122,041 B2
(45) Date of Patent: Nov. 6, 2018

(54) DEVICE AND METHOD FOR PRODUCING ELECTRODE STACKS

(71) Applicant: Jonas & Redmann Automationstechnik GMBH, Berlin (DE)

(72) Inventor: Lutz Redmann, Kleinmachnow (DE)

(73) Assignee: JONAS & REDMANN AUTOMATIONSTECHNIK GMBH, Berlin (DE)

(*) Notice: Subject to any disclaimer, the term of this patent is extended or adjusted under 35 U.S.C. 154(b) by 387 days.

(21) Appl. No.: 14/433,382

(22) PCT Filed: Sep. 30, 2013

(86) PCT No.: PCT/DE2013/000557
§ 371 (c)(1),
(2) Date: Apr. 3, 2015

(87) PCT Pub. No.: WO2014/053112
PCT Pub. Date: Apr. 10, 2014

(65) Prior Publication Data
US 2015/0263375 A1    Sep. 17, 2015

(30) Foreign Application Priority Data

Oct. 4, 2012 (DE) .................. 10 2012 019 975

(51) Int. Cl.
*H01M 6/00* (2006.01)
*H01M 10/04* (2006.01)
*H01M 10/0583* (2010.01)

(52) U.S. Cl.
CPC ... *H01M 10/0404* (2013.01); *H01M 10/0409* (2013.01); *H01M 10/0459* (2013.01);
(Continued)

(58) Field of Classification Search
CPC ......... H01M 10/0404; H01M 10/0409; H01M 10/0459; H01M 10/0583; Y10T 29/49108; Y10T 29/53135
See application file for complete search history.

(56) References Cited

U.S. PATENT DOCUMENTS 4,069,925 A * 1/1978 Ahokas .................. B65G 57/11
                                                198/464.4
4,205,836 A * 6/1980 Nystrand ............... B65H 45/20
                                                493/357

(Continued)

FOREIGN PATENT DOCUMENTS

CN    102709583    10/2012
DE    102009037727    2/2011
(Continued)

*Primary Examiner* — Raymond Alejandro
(74) *Attorney, Agent, or Firm* — JMB Davis Ben-David

(57) ABSTRACT

The invention relates to a stacking device and a method for stacking flat materials, e.g. electrodes having a separation film (1) interposed in a zigzag manner by means of a guiding device (8). The stacking device comprises a stacking table (11), a holder (4; 5) for immobilizing the stack, and grippers (6, 7) for picking the electrodes (2, 3) up and putting them down in a defined manner, said grippers having an excess pressure module (9) for the targeted shaping of a defined film pocket (17) in the separation film (1).

12 Claims, 8 Drawing Sheets

Figure 1:
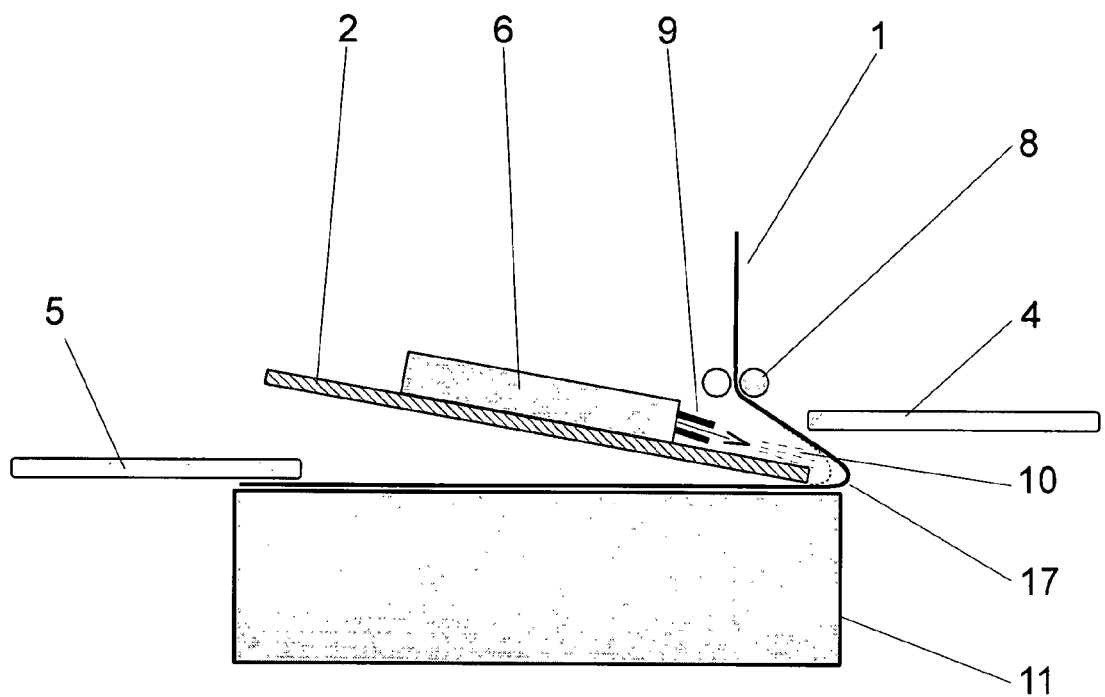

(52) U.S. Cl.
   CPC ... *H01M 10/0583* (2013.01); *Y10T 29/49108* (2015.01); *Y10T 29/53135* (2015.01)

(56) References Cited

U.S. PATENT DOCUMENTS

| | | | | |
|---|---|---|---|---|
| 6,196,538 | B1* | 3/2001 | Stauber | B65H 29/003 198/470.1 |
| 2013/0133184 | A1* | 5/2013 | Bacci | H01M 10/0404 29/623.1 |
| 2014/0087245 | A1* | 3/2014 | Lee | H01M 2/0212 429/179 |

FOREIGN PATENT DOCUMENTS

| | | |
|---|---|---|
| DE | 102010055608 | 6/2012 |
| DE | 102010055611 | 6/2012 |
| EP | 0397640 | 11/1990 |
| JP | H03230479 | 10/1991 |
| JP | 2002270242 | 9/2002 |
| JP | 2009140775 | 6/2009 |
| JP | 2013502671 | 1/2013 |

* cited by examiner

DEVICE AND METHOD FOR PRODUCING ELECTRODE STACKS

CROSS-REFERENCE TO RELATED APPLICATIONS

This is the U.S. National Stage of International Application No. PCT/DE2013/000557, filed Sep. 30, 2013, which was published in German under PCT Article 21(2), which in turn claims the benefit of German Patent Application No. 10 2012 019 975.9, filed Oct. 4, 2012.

The present invention relates to a device and a method for producing electrode stacks, in particular for use in batteries.

PRIOR ART

For automation companies, the production process of energy stores, for instance battery cells, presents substantial challenges. The wafer-thin electrodes and separators must be cut, stacked in fractions of a second to μm accuracy, and welded to conductors. These thin anodes, cathodes and separator layers are barely 0.15 mm in thickness, flexible, partially porous, and of varying sizes as well.

This places the highest demands on the automation specialists and requires extreme precision, in order to sustainably satisfy the cycle stability, service life and efficiency desired by the user.

With the assembly of batteries, electrodes, anodes and cathodes are stacked alternatingly above one another with separators as an intermediate layer. Along with the possibility to cut the anode and cathode films into electrode plates, and to stack into stacks on top of each other in a sheet-like manner with the separator interposed, there are methods to unroll the flat separator from a material roll and then place it by means of bending processes, for example in a zig-zag manner. The anode or cathode is inserted into the arising pocket-shaped intermediate spaces between the individual layers.

The document DE 10 2010 055 608 A1 describes a method for producing an electrode stack with which one layer of the electrode stack is present as an endless material and is folded alternating, and the two other layers are inserted into the pockets arising due to the folding. The folding arises here through the arrangement of delimiting rods, between which the material is inserted. The rods are then withdrawn laterally.

The document, DE10 2009 037 727 A1, describes a method for producing an electrode stack comprised of an anode, cathode, and separator, with which the relative positioning of a second layer of the electrode stack to a first layer is to be improved and thus, a complete overlap of the electrode plate should be attained. The method contains a device for feeding the separation layer from the separation layer supply roll. Here, the separation material is unrolled in predefined lengths and folded to receive the electrodes. During the redirection, a tensile force is exerted on the separation sheeting during which the electrode plate is immobilized by means of a retaining device.

With the production method according to the prior art, the problem arises that during the unrolling process and the formation of the pockets, the separation material is torn due to a method-dependent twisting or due to excessive tensile stress, and thus the entire current stack cannot be used. The fully automated production process is disrupted and the cycle times can no longer be maintained. Thus, the performance of the machine is limited. An economic disadvantage results from the interruption of the production process and with it the increase of the cycle times.

DISCLOSURE OF THE INVENTION

The subject matter of the present invention is a device and a method for producing an electrode stack comprising individual layers, for example positive and negative electrodes with interposed separation film, which are arranged in multiple layers following after another.

The object of the invention is to specify a device and a method with which during production of an electrode stack, the separation film is folded alternatingly on both sides of the electrode stack with a high fold quality and without mechanically damaging the material, and with which it is possible to stack more quickly due to an improved distribution of the occurring tensile and compressive stresses.

For this purpose, with the device according to the invention, holders, which are placed as close as possible to the fold to be formed, immobilize the material to be folded for the separation over the entire width thereof, and the pocket formation occurs due to a gas flow from an excess pressure module according to the invention over the entire width of the separation film, whereby a damage-free and gentle zig-zag folding occurs.

The invention is not limited to the use with the production of electrode stacks for a type of battery/accumulator, but rather can be used wherever flat, bendable film must be processed for the further processing. The invention is particularly advantageously applicable with the use of very thin and highly sensitive separation film.

With the device according to the invention it is possible to attain faster cycle times, thus the machine can be run at higher speeds, whereby productivity is increased and production can be cost-effective.

This object is solved according to the invention by the features in the characterizing part of claim 1. Advantageous further designs of the invention arise from the claims dependent thereupon, and in the description.

The object is solved by a device, comprising
- a stacking table for putting down and stacking electrode layers,
- at least one gripper for picking up the cell element to be put down, in particular the electrodes,
- a feeding device with a supply roll (containing endless material),
- a guiding device for the film folding,
- and a holder at each side of the electrode stack.

The at least one gripper contains according to the invention an excess pressure module with a gas outflow nozzle at least on one side which during putting down of the electrodes advantageously influences the folding process of the endless material to be placed in a zig-zag manner between the cell elements.

For the device according to the invention, in each case a holder is provided at each side via a placing table that has the task of immobilizing the already placed stack with electrodes and the separation film arranged interposed. The holder can be moved parallel to the placing table in the x- and z-direction for the stacking process. After the electrodes are suctioned for the stacking by means of the gripper and are moved to the stacking table, during putting down the next film pocket is shaped at the laterally located separation film due to the gas flow, which exits out of an outflow nozzle of the excess pressure module according to the invention at the gripper, whereby in connection with the holders and the placement movement thereof a gentle, damage-free folding of the separation film is attained.

The folding process and the placement of the holder can be designed even more gently by a gas flow out of the nozzles at the inside of the holder. The gas used at the grippers, or respectively the holder, can be, in an advantageous manner, cleaned ionized air for example.

Furthermore, the folding and placement process can be formed more gently by rollers at the inside of the holder.

Furthermore, the object is solved by a method for producing electrode stacks having positive and negative electrodes and interposed separation film to be arranged by means of zig-zag folding, in which with at least one guiding device is fed with separation film from an endless roll, with at least one gripper picking up and putting down electrodes, a directed gas flow is generated, by means of an excess pressure module arranged at the gripper, in such a manner that the gas flow exiting from the excess pressure module forms a film pocket by redirecting the separation film, and the formed film pocket is immobilized by means of a holder, which is arranged laterally at a stacking table provided for receiving the electrode stacks.

Here, the guiding device is preferably moved alternatingly.

The folding of the separation film can be supported by means of redirection rollers, provided with the holders on the inside facing toward the separation film, and/or by means of the effect of a gas flow from each of an outflow nozzle, which is provided at the holder, in each case on the inside facing toward the separation film.

The subject matter of the invention is described in the following in more detail using the FIGS. 1 to 8, without limiting the invention to the types of embodiments shown there as an example.

Figure 2:
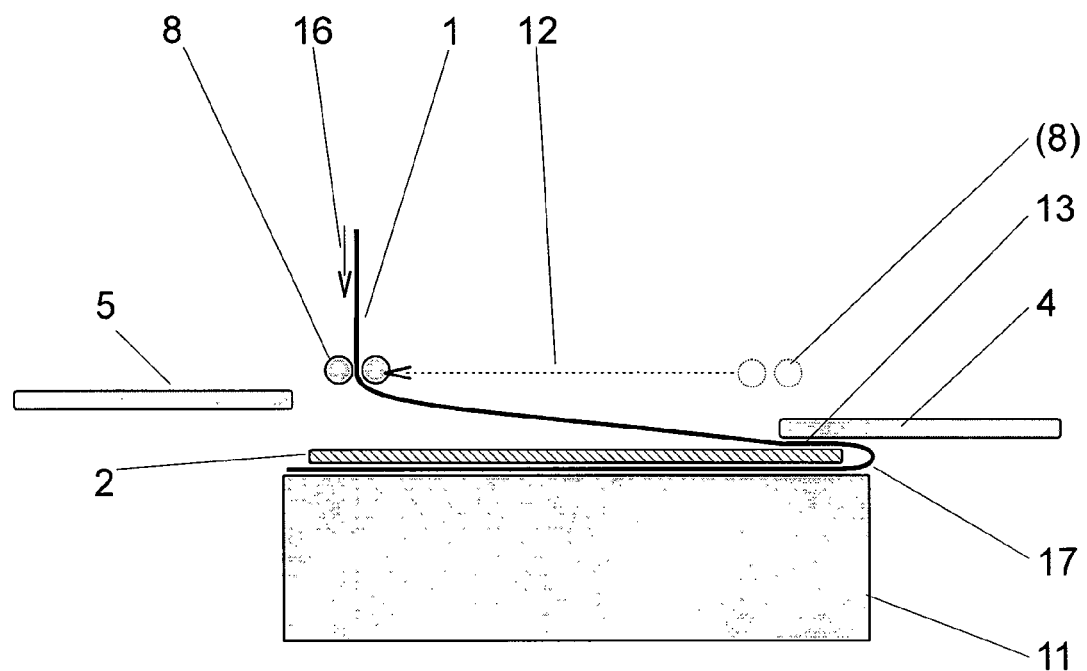
Figure 3:
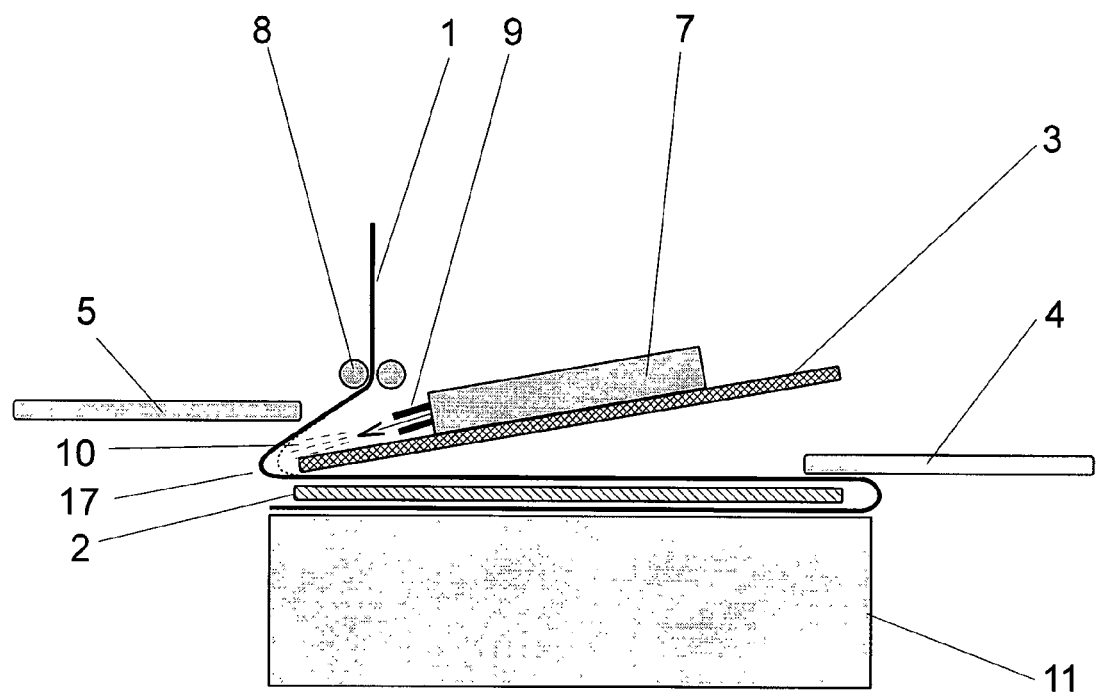
Figure 4:
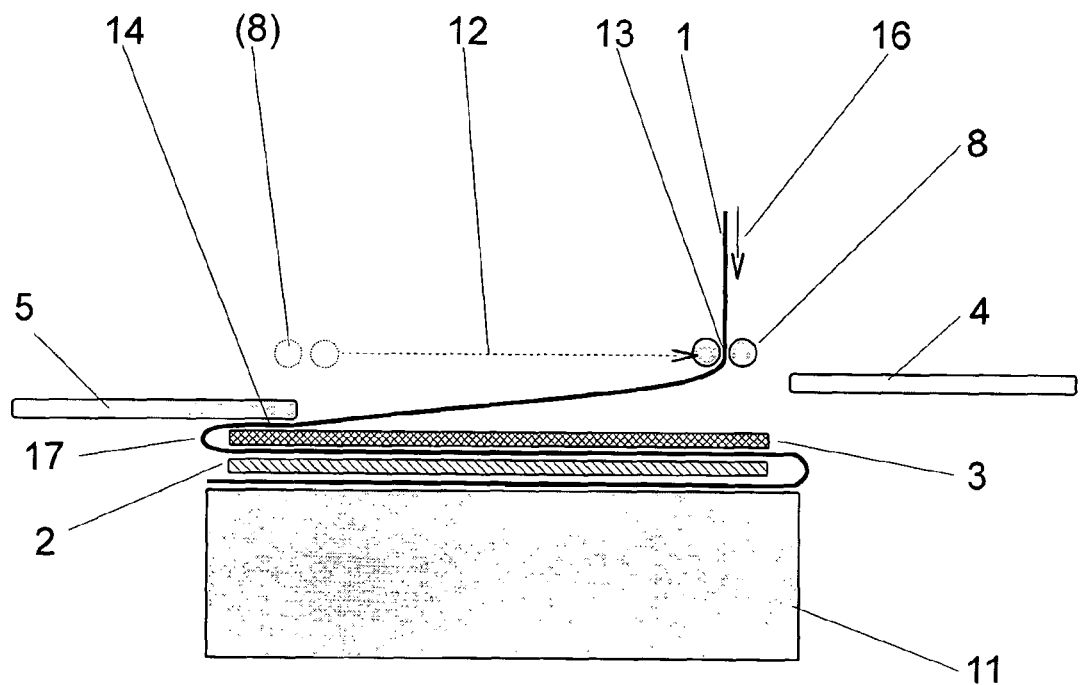
Figure 5:
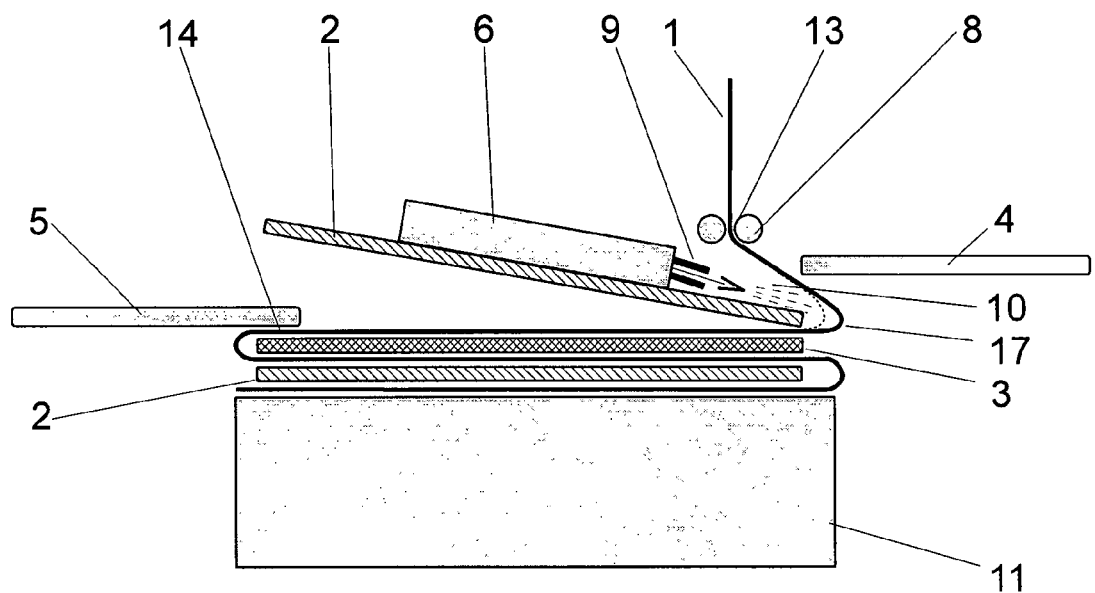
Figure 6:
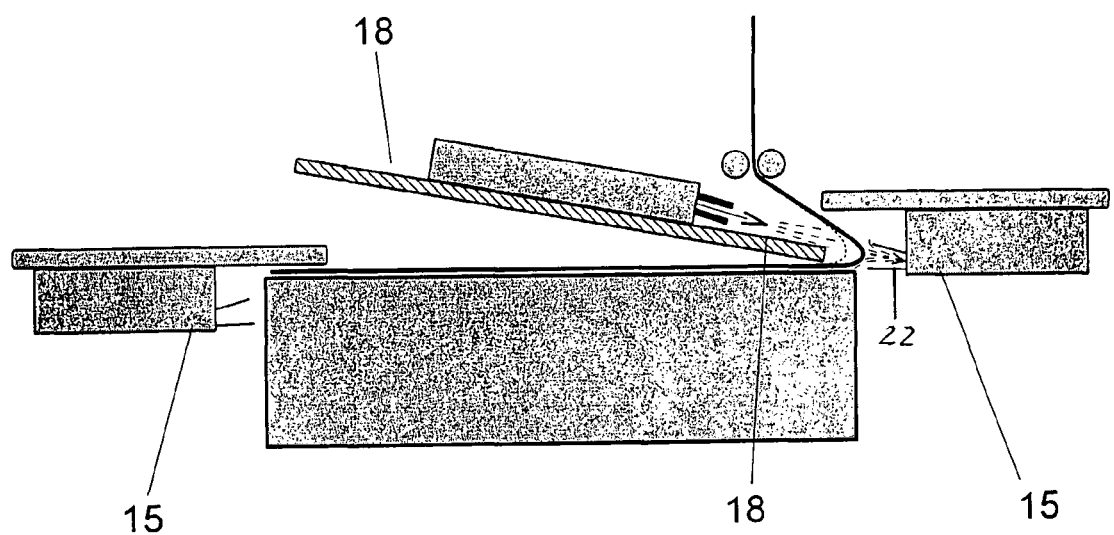
Figure 7:
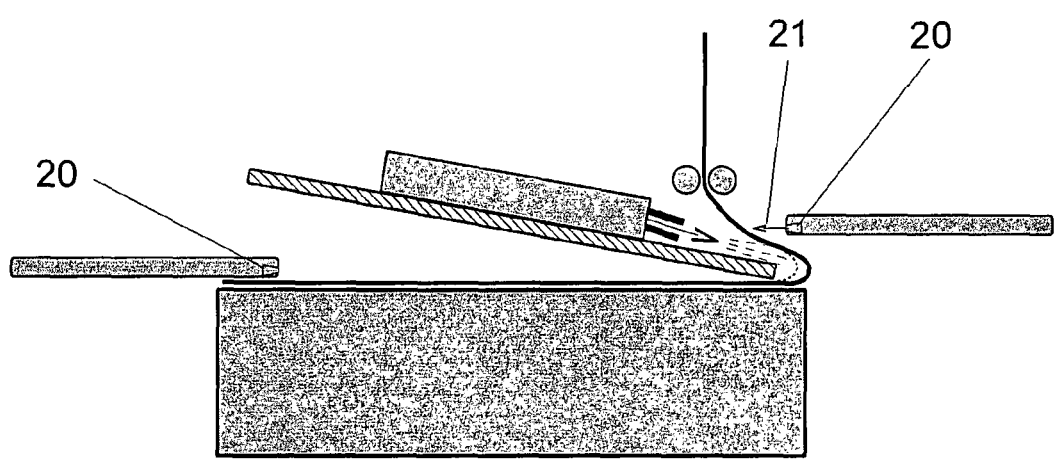
Figure 8:
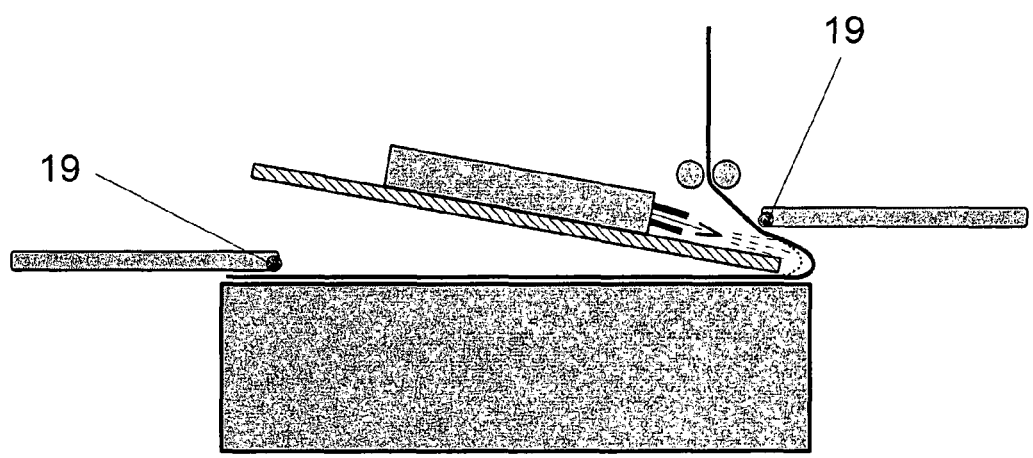

The figures show:

FIG. 1 a representation in principle of the device according to the invention in the situation of putting down the first electrode 2, FIG. 2 the device after putting down the first electrode, during turning over the separation film 1 (with immobilized first electrode 2), FIG. 3 a representation in principle of the device according to the invention in the situation of putting down the second electrode 3, FIG. 4 the device after putting down the second electrode 3, during turning over the separation film 1 onto the other side (with immobilized first and second electrode 2, 3), FIG. 5 a representation in principle of the device according to the invention in the situation of putting down the third electrode 2, FIG. 6 design of the device according to the invention with support of the turning over and folding of the separation film 1 from outside by means of a low pressure module 9 at the holders 4, 5, FIG. 7 the device with support of the turning over and folding of the separation film 1 by means of a gas flow 21 from outflow nozzles 20 at the holders, FIG. 8 the device with support of the turning over and folding of the separation film 1 by means of redirection rollers 19 at the holder 4, 5.

According to FIG. 1, a holder 5 according to the invention initially immobilizes the start of the separation film 1 on the stacking table 11 while a gripper 6 places an electrode 2, removed from a supply stack of electrodes, not shown in more detail, onto the separation film 1 on the stacking table 11. The gripper 6 for handling the electrodes can be, for instance a typical suction gripper.

An excess pressure module 9 according to the invention is arranged at the gripper 6 laterally in the direction of the supplied separation film 1. A film pocket 17 is formed where the fold of the separation film 1 is to be attained with the help of a gas flow 10 out of the excess pressure module 9 arranged at the gripper 6. The feeding of the separation film 1 from a supply roll, not shown in more detail, to the guiding device 8 is realized in a customary manner. The drive technology with drive rolls, tension rollers, idle rollers, redirection rollers, required for this purpose is technically conventional and is not described specifically.

FIG. 2 shows the device after putting down the first electrode 2 during turning over the separation film 1 (with immobilized first electrode 2).

After the holder 4 has immobilized the folded separation film 1 on the electrode 2, the electrode 2 is covered with the separation film 1 with the help of the guiding device 8 moved on the left side. The holder 5 exposes the region for forming a new film pocket 17.

As shown in FIG. 3, in a mirror-image to FIG. 1, a further electrode 3 is put down on the stack by means of a gripper 7, and in doing so a new film pocket 17 is formed for the wrapping of the separation film 1.

Advantageously, during positioning and putting the electrodes 2, 3 down, the gripper 6, 7 with the retained electrode 2, 3 is inclined slightly laterally in the direction of the film pocket 17, in order to attain an improved positioning in the region of the forming film pocket 17, and to avoid a collision of the electrode 2, 3 with the holder 4, 5 lying opposite (shown in FIGS. 1 and 5).

Further, in the device according to the invention, the width of the gripper 6, 7 is formed such that an overhang 18 of the electrode 2, 3 arises in the direction of the film pocket 17 and in the opposite direction, that is, the electrode 2, 3 extends beyond the gripper 6, 7. The size of the film pocket 17 formed depends on the free separator length between the fixed points 13 on the guiding device 8 and 14 on the holder 4, 5.

As shown in FIG. 4, after putting the electrode 3 down onto the electrode stack, the holder 5 located over the formed film pocket 17 immobilizes the electrode stack, including the newly put down electrode 3 and the last formed film pocket 17 of the separation film 1. The opposite holder 4 is moved into a rest position outside of the stacking table 11. For the next electrode to be put down, after removing the grippers 6, 7 out of the putting down area over the electrode stack, the separation film 1 is guided onto the other side of the stacking table 11 by means of the guiding device 8.

FIG. 5 shows the placement of the next electrode 2, wherein again using the gas flow 10 out of the excess pressure module 9 located on the gripper 6, the next film pocket 17 is formed of the separation film 1.

In a further embodiment of the invention shown in FIG. 6, a low pressure module 15 is arranged beneath the holder 4, 5. The low pressure module 15 advantageously serves for further forming the film pocket 17, wherein a suction nozzle 22 is arranged at the low pressure module 15 in the direction of the film pocket 17 to be formed.

FIG. 7 shows an embodiment of the invention in which the film folding is supported by a gas flow 21 out of an outflow nozzle 20 at the holders 4, 5.

FIG. 8 shows an embodiment of the invention in which the holders 4, 5 are equipped with redirection rollers 19 for gentle placement onto the electrode stack.

REFERENCE LIST 1 separation film
2 electrode 3 electrode
4 right holder
5 left holder
6 gripper, excess pressure module, right
7 gripper, excess pressure module, left
8 guiding device
9 excess pressure module with outflow nozzle
10 gas flow
11 stacking table
12 movement direction of the guiding device
13 immobilizing point of the film guide
14 immobilizing point of the holder
15 low pressure module
16 feeding of separation film
17 film pocket
18 overhang of the electrodes
19 redirection roller at the holder
20 outflow nozzle at the holder
21 gas flow out of the holder
22 suction nozzle

The invention claimed is:

1. A device for producing electrode stacks having positive and negative electrodes (2, 3) and interposed separation film (1), to be arranged by means of a zig-zag folding, having at least one guiding device (8) for feeding the separation film (1) from an endless roll, having a stacking table (11) for receiving the electrode stack and at least one gripper (6, 7) for picking up and putting down the electrodes (2, 3), characterized in that an excess pressure module (9) is arranged at the gripper (6, 7) for generating a directed gas flow (10) such that the gas flow (10) exiting from the excess pressure module (9) forms a film pocket (17) through the redirection of the separation film (1), and that holders (4, 5) are arranged on each side of the stacking table (11), wherein a holder (4, 5) serves for the purpose of immobilizing the formed film pocket (17).

2. The device for producing electrode stacks according to claim 1, characterized in that the holders (4, 5) have at least the same width as the separation film (1).

3. The device for producing electrode stacks according to claim 1, characterized in that the gripper (6, 7) is implemented narrower than the electrodes (2, 3) to be picked up and put down, and an overhang (18) of the electrodes (2, 3) arises.

4. The device for producing electrode stacks according to claim 1, characterized in that the guiding device (8) can be movable alternatingly.

5. The device for producing electrode stacks according to claim 1, characterized in that the gas flow (10) is an air flow, preferably cleaned and ionized.

6. The device for producing electrode stacks according to claim 1, characterized in that the gripper (6, 7) is arranged parallel to the stacking table (11).

7. The device for producing electrode stacks according to claim 1, characterized in that the gripper (6, 7) is arranged inclined, wherein the lowest point of the incline is located in the direction of the pocket (17) forming in the separation film (1).

8. The device for producing electrode stacks according to claim 1, characterized in that the holders (4, 5) can be moved in the x-z planes to the stacking table (11).

9. The device for producing electrode stacks according to claim 1, characterized in that the separation film (1) can be immobilized at a fixing point (13) by means of the guiding device (8).

10. The device for producing electrode stacks according to claim 1, characterized in that a low pressure module (15) for further shaping of the film pocket (1) is arranged beneath the holder (4, 5).

11. The device for producing electrode stacks according to claim 1, characterized in that the holders (4, 5) are provided on the inside facing toward the separation film (1), with redirection rollers (19) for supporting the folding of the separation film (1).

12. The device for producing electrode stacks according to claim 1, characterized in that an outflow nozzle (20) for a gas flow (21) is provided on the inside of each holder (4, 5) facing toward the separation film (1), wherein the gas flow (21) supports the folding of the separation film (1) due to the effects thereof.

* * * * *